US011900897B2

United States Patent
Wu et al.

(10) Patent No.: US 11,900,897 B2
(45) **Date of Patent: *Feb. 13, 2024**

(54) SYSTEM AND METHOD TO PROVIDE HIGH-QUALITY BLENDING OF VIDEO AND GRAPHICS

(71) Applicant: Avago Technologies International Sales Pte. Limited, Singapore (SG)

(72) Inventors: David Chaohua Wu, San Diego, CA (US); Richard Hayden Wyman, Sunnyvale, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,734

(22) Filed: Jul. 20, 2022

(65) Prior Publication Data

US 2022/0358896 A1 Nov. 10, 2022

Related U.S. Application Data

(63) Continuation of application No. 17/164,778, filed on Feb. 1, 2021, now Pat. No. 11,430,406, which is a continuation of application No. 15/178,621, filed on Jun. 10, 2016, now Pat. No. 10,909,949.

(60) Provisional application No. 62/335,278, filed on May 12, 2016, provisional application No. 62/174,911, filed on Jun. 12, 2015.

(51) Int. Cl.
*G09G 5/02* (2006.01)
*G09G 5/06* (2006.01)
*G09G 5/397* (2006.01)

(52) U.S. Cl.
CPC ............... *G09G 5/026* (2013.01); *G09G 5/06* (2013.01); *G09G 5/397* (2013.01); *G09G 2340/06* (2013.01); *G09G 2340/10* (2013.01)

(58) Field of Classification Search
CPC .......... G09G 5/026; G09G 5/06; G09G 5/397; G09G 2340/06; G09G 2340/10
USPC .......................................................... 345/592
See application file for complete search history.

(56) References Cited

U.S. PATENT DOCUMENTS

2010/0245613 A1* 9/2010 Siddiqui .................. G06T 5/50 348/222.1
2011/0254976 A1 10/2011 Garten
2013/0120431 A1* 5/2013 Kawaguchi ............ H04N 1/628 345/590
2014/0071124 A1 3/2014 Kawahara
2016/0080716 A1* 3/2016 Atkins .............. H04N 5/44504 348/599
2016/0366449 A1 12/2016 Stessen

* cited by examiner

*Primary Examiner* — Hai Tao Sun

(57) ABSTRACT

A system and method are provided to generate blended video and graphics using a blending domain. The system converts video from a first domain to a blending domain. The system converts graphics from a second domain to the blending domain and blends the video and graphics in the blending domain to generate a blended output.

18 Claims, 8 Drawing Sheets

SYSTEM AND METHOD TO PROVIDE HIGH-QUALITY BLENDING OF VIDEO AND GRAPHICS

PRIORITY CLAIM

This application is a continuation of U.S. patent application Ser. No. 17/164,778 filed Feb. 1, 2021, entitled "System and Method to Provide High-Quality Blending of Video and Graphics", which is a continuation of U.S. patent application Ser. No. 15/178,621 filed Jun. 10, 2016, entitled "System and Method to Provide High-Quality Blending of Video and Graphics", which claims priority to U.S. Provisional Patent Application No. 62/335,278 filed May 12, 2016, entitled "System and Method to Provide High-Quality Blending of Video and Graphics", and U.S. Provisional Patent Application No. 62/174,911 filed Jun. 12, 2015, entitled "System and Method to Provide High-Quality Blending of Video and Graphics in High Dynamic Range (Extended Image Dynamic Range) and Extended Gamut Applications" the content of each of which is hereby incorporated by reference in its entirety.

TECHNICAL FIELD

The present invention relates generally to a system and method to provide high-quality blending of video and graphics.

BACKGROUND

Blending video and graphics is becoming increasingly difficult as the formats for video and graphics become increasingly complex and diverse. Methods to accomplish blending of video and graphics can become time consuming and require additional processing resources. As the demand for more complex video continues to increase, the blending graphics for display may present increasing challenges.

DETAILED DESCRIPTION

Video follows a collection of standards that formalize color-primaries, white-point, peak brightness and nonlinear/linear light encoding and decoding specifications. In the case of traditional high-definition (HD) video, these may be ITU-R REC. BT.709 (color and nonlinear encoding—hereafter termed colorspace) and ITU-R REC. BT.1886 (nonlinear decoding—hereafter termed nonlinear-space). Standard-definition (SD) video may use ITU-R REC. BT.601 (colorspace) and ITU-R REC. BT.1886 (nonlinear-space). Targeted at (but not limited to) ultra-high definition (2160 p) video, ITU-R REC. BT.2020 (a colorspace) allows for a wider gamut, giving deeper and more saturated colors.

Standard dynamic range (SDR) video typically has a peak brightness of 100 cd/m2 and a minimum black level of around 0.1 cd/m2. ITU-R REC. BT.1886 is often used as an efficient nonlinear encoding that reasonably well matches the human visual system. High dynamic range (HDR) (sometimes termed extended image dynamic range) video can have a peak brightness of 1000 cd/m2, 4000 cd/m2 or even 10000 cd/m2. The black level for HDR video can be 0.001 cd/m2 or lower. Often, SMPTE ST.2084 is used as the nonlinear-space for HDR video. While ITU-R REC. BT.1886 (or other) may be used as the nonlinear-space for HDR video, a greater bit-depth may still be required to match the human visual system perception of quantization that the SMPTE ST.2084 nonlinear-space provides.

Traditional SDR SD, HD and UHD video differ in colorspace but share the nonlinear-space definition. Often, HDR video will utilize a different nonlinear-space compared to its SDR counterpart. When blending graphics (such as closed captions or on-screen guides) with video, a value of "alpha" is traditionally provided for the entire graphics plane or on a per-pixel basis. This value of alpha (ranging from 0.0 to 1.0) controls the blend of video and graphics so that at its extremes, 100% video or 100% graphics is shown for a given pixel and mid-range values of alpha give a blend of both video and graphics at that pixel.

Figure 1:
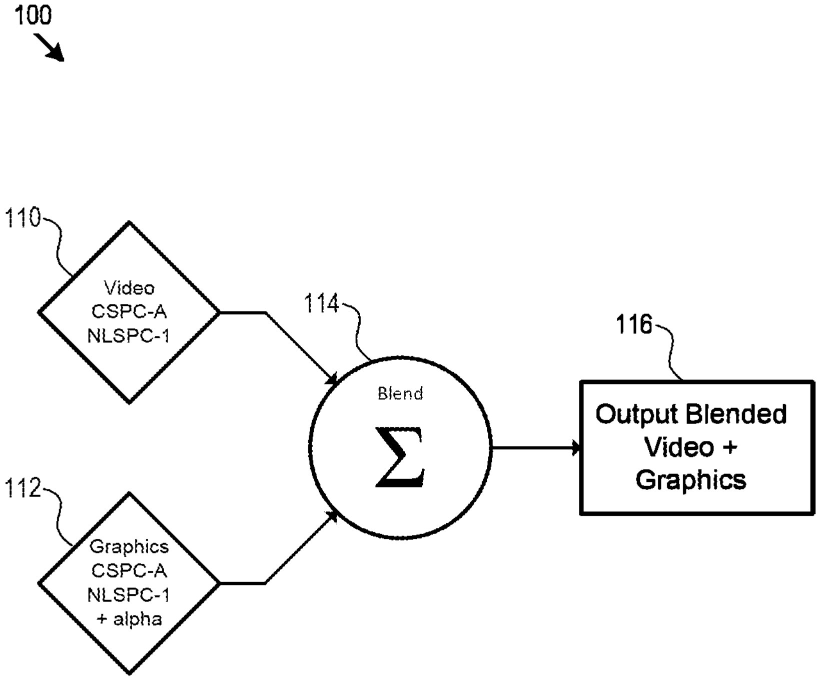
FIG. 1 is a block diagram of a system for video and graphics blending with matching colorspaces and matching nonlinear encoding.

One example of a video and graphics blending system 100 is provided in FIG. 1. Video 110 is received by the system 100. The video 110 may be streamed video and/or stored in a memory by the system 100. The video 110 may be provided in a first colorspace (CLSPC-A). The video 110 may be provided in a first nonlinear space (NLSPC-1). Graphics 112 may also be received by the system 100. The graphics 112 may be generated by a graphics engine and/or stored in a memory by the system 100. The graphics 112 may be provided in the first colorspace (CLSPC-A). The graphics 112 may be provided in the first nonlinear space (NLSPC-1). The graphics may also include a set of alpha values for defining how the video and graphics will be blended. A processor may perform a blending algorithm 114 on the received video 110 and graphics 112 to generate a video output 116 that is the result of the blended video and graphics. In this example, the video output 116 may be formatted in the first colorspace (CLSPC-A). The video output 116 may be formatted in the first nonlinear space (NLSPC-1).

In order to provide a high-quality blend of video and graphics, the system may be designed such that both the video and graphics are initially generated in a matching colorspace and nonlinear-space before the blend occurs. In the case that the colorspace and nonlinear-space of the video and graphics already match, blending is readily achieved as shown in FIG. 1, where CLSPC-A may be, for example, BT.709 Y'CbCr or R'G'B' and NLSPC-1 may be, for example, BT.1886.

Figure 2:
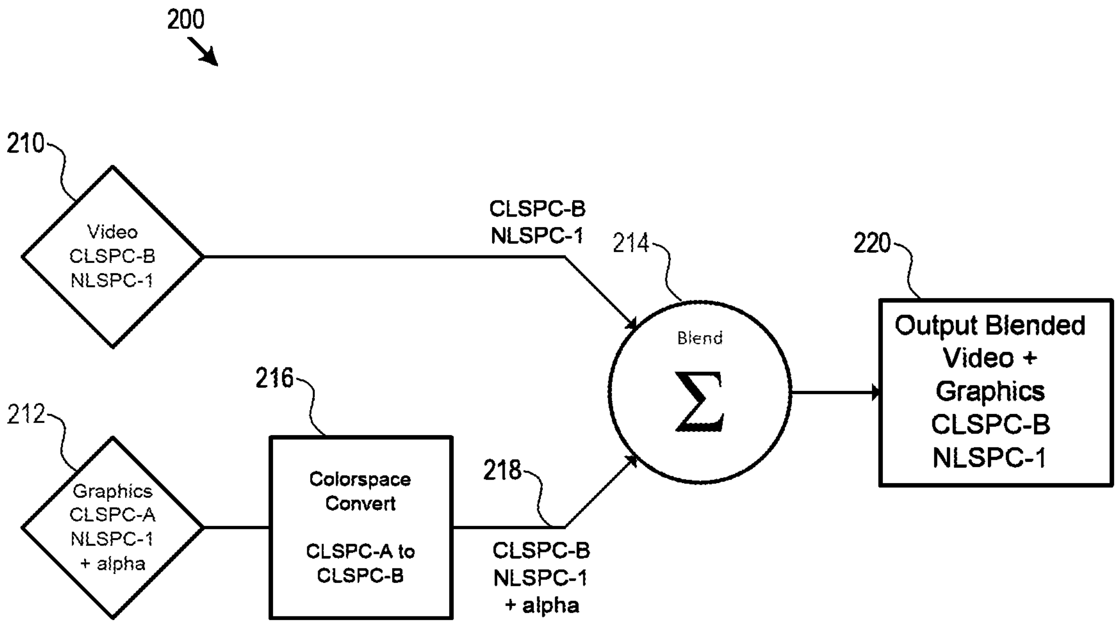
FIG. 2 is a block diagram of a system for video and graphics blending with mismatching colorspaces and matching nonlinear encoding.

Another example of a video and graphics blending system 200 is provided in FIG. 2. Video 210 is received by the system 200. The video 210 may be streamed video and/or stored in a memory by the system 200. The video 210 may be formatted in a second colorspace (CLSPC-B). The video 210 may be formatted in a first nonlinear space (NLSPC-1). Graphics 212 may also be received by the system. The graphics 212 may be generated by a graphics engine and/or stored in a memory by the system. The graphics 212 may be provided in a first colorspace (CLSPC-A). The graphics 212 may be provided in the first nonlinear space (NLSPC-1). The graphics may also include a set of alpha values for defining how the video and graphics will be blended. A processor may perform colorspace conversion 216 of the graphics. The graphics are converted to the second colorspace (CLSPC-B) along with the alpha to generate converted graphics 218. The converted graphics 218 may remain in the first nonlinear space (NLSPC-1).

A processor may perform blending processing 214 on the received video 210 and converted graphics 218 to generate a video output 220 that is the result of the blended video and graphics. In this example, the video output 220 may be generated in the second colorspace (CLSPC-B). The video output 220 may be generated in the first nonlinear space (NLSPC-1).

As such, FIG. 2 shows the case where the nonlinear-space of the video and graphics match, but the colorspaces do not match. CLSPC-A may be, for example, BT.709 Y'CbCr or R'G'B'. CLSPC-B may be, for example, BT.2020 Y'CbCr or R'G'B'. NLSPC-1 may be, for example, BT.1886. One method of handling this case is to convert the colorspace of the graphics to match that of the video. The procedure detailed in FIG. 2 works well in practice.

The blending of a front color at top of a back color is through blending of each front component and back color component as described in Equation 1. Each blended color component equals to the sum of the front color component scaled with a front blend factor and the back color component scaled with a back blend factor. Both front blend factor and back blend factor can be normalized floating point number between 1.0 and 0.0. The front blend factor normally reflects the proportion of front color visible in the blended color versus back color. The back blend factor normally is the complement of front blend factor such as (1.0-front blend factor). The sum of front blend factor and back blend factor equals 1.0.

In the discussion of graphics and video blending in FIG. 1 and FIG. 2, graphics are usually blended at the top of video or graphics is the front color and video is the back color. An example of blending equation of graphics component and video component is shown in Equation 2. Both graphics component and video component can be in the same format of the same color space and the same nonlinear-colorspace. Two examples of component formats are Y', Cb, Cr or R', G', B'. Alpha in Equation 2 is a normalized floating point number between 1.0 and 0.0. Alpha value normally reflects the proportion of graphics visible in the blended output versus video.

It is a possible case that more than one graphics are blended first before the blended graphics is further blended at the top of a video. The blended graphics is usually already scaled with alpha. It is usually called an alpha-pre-multiplied graphics. The blending equation of alpha-pre-multiplied graphics and a video is shown in Equation 3

BlendedComponent=FrontComponent*FrontBlendFactor+BackComponent*BackBlendFactor

Equation 1 General Blending Equation of a Front Color Component and a Back Color Component Blended VideoGraphicsComponent=GraphicsCompoent*alpha+VideoComponent*(1.0−alpha)

Equation 2 Blending Equation of a Graphics Component and a Video Component

BlendedVickoGraphicsComponent=alpha Pr eMu-laphedGraphwsComponent+VideoComponent*(1.0−alpha)

Figure 3:
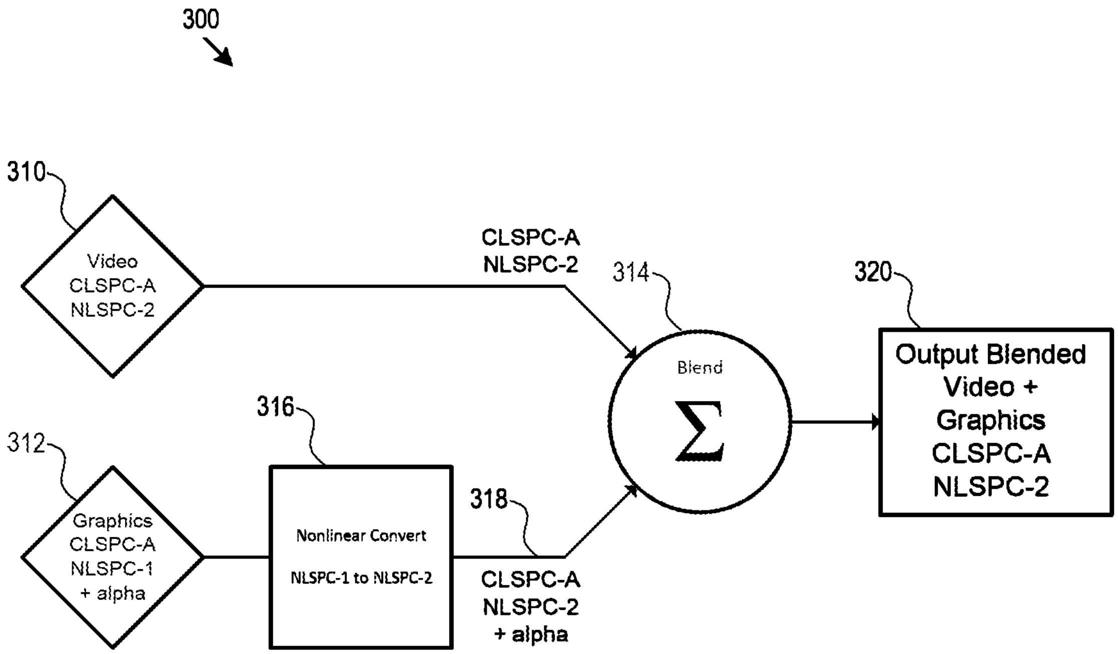
FIG. 3 is a block diagram of a system for video and graphics blending with matching colorspaces and mismatching nonlinear encoding.

Equation 3 Blending Equation of an Alpha-Pre-multiplied Graphics Component and a Video Component Another example of a video and graphics blending system 300 is provided in FIG. 3. Video 310 is received by the system. The video 310 may be streamed video and/or stored in a memory by the system. The video 310 may be provided in a first colorspace (CLSPC-A). The video 310 may be provided in a second nonlinear space (NLSPC-2). Graphics 312 may also be received by the system. The graphics 312 may be generated by a graphics engine and/or stored in a memory by the system. The graphics 312 may be provided in the first colorspace (CLSPC-A). The graphics 312 may be provided in a first nonlinear space (NLSPC-1). The graphics may also include a set of alpha values for defining how the video and graphics will be blended. A processor may perform nonlinear space conversion 316 of the graphics. The graphics are converted to the second nonlinear space (NLSPC-2) to generate converted graphics 318. The converted graphics 318 may remain in the first colorspace (CLSPC-A).

A processor may perform blending processing 314 on the received video 310 and converted graphics 318 to generate a video output 320 that is the result of the blended video and graphics. In this example, the video output 320 may be formatted in the first colorspace (CLSPC-A). The video output 320 may also be formatted in the second nonlinear space (NLSPC-2).

In the case where nonlinear-space mismatches between the video and the graphics, FIG. 3 shows an adaptation of techniques to handle the situation. Here, CLSPC-A may be, for example, BT.709; NLSPC-1 may be, for example, BT.1886 and NLSPC-2 may be, for example, SMPTE ST. 2084.

In the specific cases that alpha=0.0 or alpha=1.0, the system of FIG. 3 works well. But for the general case of alpha is not equal to 0.0 nor 1.0, it is found that the blended video and graphics may not look correct and appear as one would expect a traditional video and graphics blend to appear. For an example, depending on video and graphics content, and the alpha value, the graphics in blended output may appear more proportional to video in some color region and less proportional to video in other color region according to alpha value.

Figure 4:
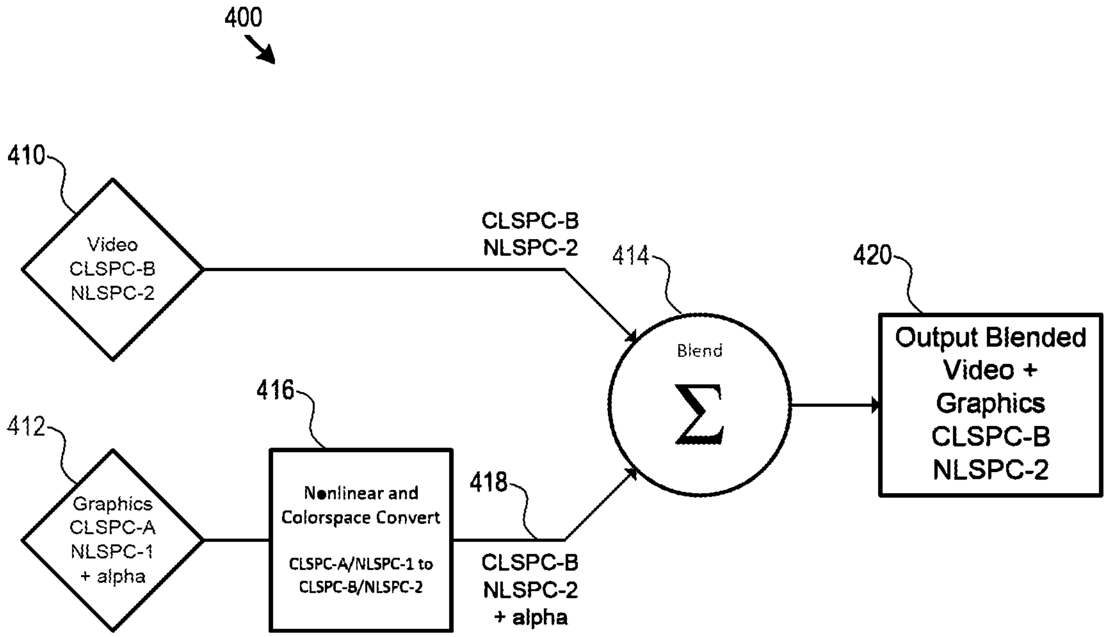
FIG. 4 is a block diagram of a system for video and graphics blending with mismatching colorspaces and mismatching nonlinear encoding.

One example of a video and graphics blending system 400 is provided in FIG. 4. Video 410 is received by the system 400. The video 410 may be streamed video and/or stored in a memory by the system 400. The video 410 may be provided in a second colorspace (CLSPC-B). The video 410 may be provided in a second nonlinear space (NLSPC-2). Graphics 412 may also be received by the system. The graphics 412 may be generated by a graphics engine and/or stored in a memory by the system. The graphics 412 may be provided in a first colorspace (CLSPC-A). The graphics 412 may be provided in a first nonlinear space (NLSPC-1). The graphics may also include a set of alpha values for defining how the video and graphics will be blended. A processor may perform nonlinear space conversion 416 of the graphics. The graphics are converted to the second nonlinear space (NLSPC-2) and converted to the second colorspace (CLSPC-B) to generate converted graphics 418.

A processor may perform blending processing 414 on the received video 410 and converted graphics 418 to generate a video output 420 that is the result of the blended video and graphics. In this example, the video output 420 may be formatted in the second colorspace (CLSPC-B). The video output 420 may also be formatted in the second nonlinear space (NLSPC-2).

In the case that both the nonlinear-space and the colorspace mismatch between the video and the graphics, FIG. 4 shows an adaptation of various techniques to handle the situation. Here, CLSPC-A may be, for example, BT.709; CLSPC-B may be, for example, BT.2020; NLSPC-1 may be, for example, BT.1886 and NLSPC-2 may be, for example, SMPTE ST. 2084. Similarly to above, in the specific cases that alpha=0.0 or alpha=1.0, the system of FIG. 4 works well. But for the general case of alpha is not equal to 0.0 nor 1.0, it is found that the blended video and graphics does not look correct and appear as one would expect a traditional video and graphics blend to appear.

Figure 5:
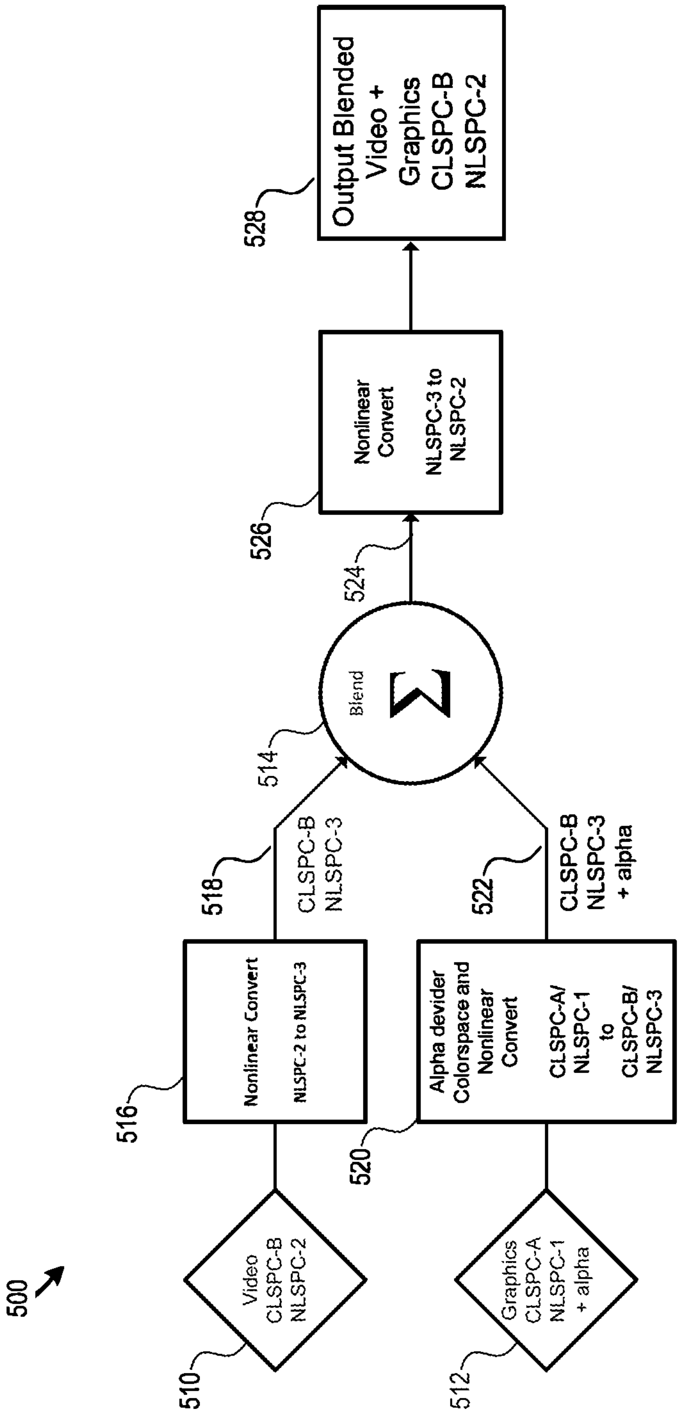
FIG. 5 is a block diagram of a system for video and graphics blending where the video and graphics are both converted into a blending domain.

One example of a video and graphics blending system 500 that uses a blending domain is provided in FIG. 5. Video 510 is received by the system 500. The video 510 may be streamed video and/or stored in a memory by the system 500. The video 510 may be formatted in a second colorspace (CLSPC-B). The video 510 may be formatted in a second nonlinear space (NLSPC-2). A processor may perform nonlinear space conversion 516 of the video. The video is converted to the third nonlinear space (NLSPC-3) and may remain in to the second colorspace (CLSPC-B) to generate converted video 518.

Graphics 512 may also be received by the system. The graphics 512 may be generated by a graphics engine and/or stored in a memory by the system. The graphics 512 may be formatted in a first colorspace (CLSPC-A). The graphics 512 may be formatted in a first nonlinear space (NLSPC-1). The graphics may also include a set of alpha values for defining how the video and graphics will be blended. A processor may perform nonlinear space and color space conversion 520 of the graphics. The graphics are converted to the third nonlinear space (NLSPC-3) and converted to the second colorspace (CLSPC-B) to generate converted graphics 522.

A processor may perform blending processing 514 on the converted video 518 and converted graphics 522 to generate a blended output 524 that is the result of the blended video and graphics. In this example, the blended output 524 may be formatted in the second colorspace (CLSPC-B). The blended output 524 may also be formatted in the third nonlinear space (NLSPC-3).

A processor may perform nonlinear space conversion 526 of the blended output 524. The blended output 524 is converted from the third nonlinear space (NLSPC-3) to the second nonlinear space (NLSPC-2) and may remain in to the second colorspace (CLSPC-B) to generate an output video 526.

Here, the video and graphics are converted into a "blending domain" that is more visually natural—NLSPC-3. When graphics is blended with video based on an alpha value, a particular visual effect is anticipated based on experience and expectations of how this blend has appeared in traditional colorspaces and nonlinear spaces. For example, if the alpha is set to 0.5 (50% video and 50% graphics), a certain expectation of brightness of the darks, midrange and highlights of the video and graphics will be anticipated. This is termed a "visually natural" blend. Blending in some nonlinear spaces can look markedly different and sometimes, strange compared to traditional blends in traditional colorspaces and nonlinear spaces. This would be termed not "visually natural". NLSPC-2 is likely specified with a HDR max brightness which can be significantly higher than the traditional SDR max brightness. NLSPC-3 may also match the max brightness of NLSPC-2. The blending domain is such that when the video and graphics are blended using arbitrary alpha, the resulting blended image looks and behaves in the way that typical, legacy SDR video and graphics behaved, but with the video max brightness that is possibly in HDR specification. After blending, the nonlinear space is mapped to the output format (NLSPC-2 in this case).

The blending of video and graphics using NLSPC-3 may look and behave like typical, legacy SDR video and graphics blending. Its visible quantization may be worse than using NLSPC-2. The component bit width of blended NLSPC-3 may need to be increased to match the visible quantization effect in NLSPC-2

It is also likely the max brightness of input SDR graphics still look darker than visually expected in a much brighter HDR display. The max brightness of input SDR graphics relative to the max brightness of HDR display may be further adjusted higher according to the max brightness of HDR specification. As examples, 8-bit, CLSPC-A may be BT.709 YCbCr, NLSPC-1 may be BT.1886 with max brightness of 100 cd/m2, 10-bit CLSPC-B may be BT.2020 YCbCr, NLSPC-2 may be SMPTE ST.2020 with max brightness of 1000 cd/m2 in HDR specification and NLSPC-3 may be BT.1886 YCbCr. The blended output of CLSPC-B/NLSPC-3 may be in 12-bit or more. In the case that NLSPC-3 matches NLSPC-1, for example, the max brightness of legacy SDR graphics of 100 cd/m2 is quite a bit smaller than HDR specification of 1000 cd/m2, or the normalized SDR graphics brightness of NLSPC-2 is at 0.1 relative to the max brightness of CLSPC-2 of 1000 cd/m2, the SDR brightness may be further adjusted higher to 200 or 300 cd/m2 or 0.2 or 0.3 in the normalized brightness of NLSPC-2 to look properly bright. Nonlinear conversion may still be used for the graphics before the blend.

In case of alpha-pre-multiplied graphics, some cases of non-linear conversion between NLSPC-1 and NLSPC-2 do not output correctly alpha-multiplied graphics in NLSPC-2. For example when alpha-pre-multiplied graphics in BT. 1886 (=alpha*[GraphicsComponent in1886]) is converted directly to SMPTE ST.2084, the result is no longer equal to (alpha*[GraphicsComponentinSMPTE2084]). An alpha divider may be used to restore alpha-pre-multiplied alpha to non-alpha-pre-multiplied graphics before the conversion. If the blending is processed according to FIG. 5, alpha-pre-multiplied graphics can be converted in NLSPC-3 as if it is conventional graphics with BT.1886.

Further aspects of the disclosed system could be to include the functional computation of FIG. 5 into a large lookup table (FIG. 6) that is preprogrammed to take the video, graphics and alpha as inputs and to produce the interpolated output of the desired "visually natural blending" for all combinations of input at the output.

Figure 6:
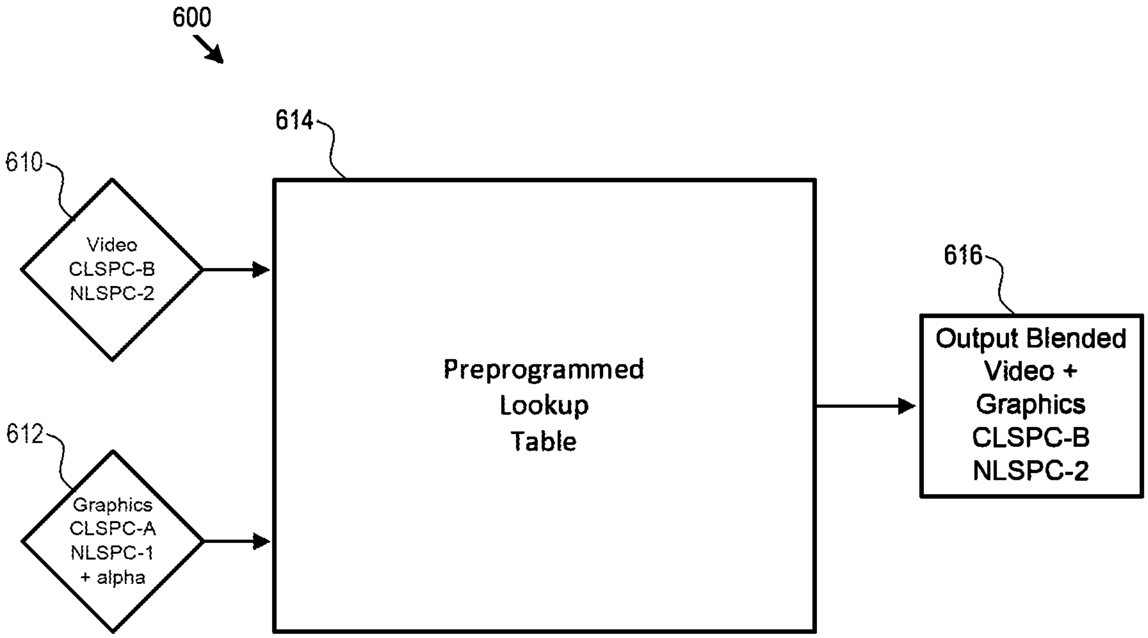
FIG. 6 is a block diagram of another system for video and graphics blending where the video and graphics are both converted into a blending domain using a look up table.

One example of a video and graphics blending system 600 using a lookup table is provided in FIG. 6. Video 610 is received by the system 600. The video 610 may be streamed video and/or stored in a memory by the system 600. The video 610 may be provided in a second colorspace (CLSPC-B). The video 610 may be provided in a second nonlinear space (NLSPC-2).

Graphics 612 may also be received by the system. The graphics 612 may be generated by a graphics engine and/or stored in a memory by the system. The graphics 612 may be provided in a first colorspace (CLSPC-A). The graphics 612 may be provided in a first nonlinear space (NLSPC-1). The graphics may also include a set of alpha values for defining how the video and graphics will be blended.

A lookup table 614 (for example a preprogrammed lookup table with interpolated output) may contain decimated pre-calculated values for performing the colorspace conversions, nonlinear conversions, and blending of the video and graphics as described with respect to blocks 514, 516 520, and 526. The lookup table may be a seven dimensional lookup table. The lookup table may include input parameters such as Y, Cb, and Cr values of the video, Y, Cb, and Cr values of the graphics and the alpha of the graphics, or in another implementation I, P, and T values of the video, I, P, and T values of the graphics, and alpha values of the graphics. More specifically, the video may be in a different colorspace and/or nonlinear space than the graphics and the alpha of the graphics. Further, the output of the lookup table may be provided in the colorspace and/or nonlinear space as the video input.

The blended output which was the interpolation of pre-calculation as being blended in the third nonlinear space (NLSPC-3) is provided from the lookup table 614 in the second nonlinear space (NLSPC-2) and the second colorspace (CLSPC-B) to generate an output video 616.

The multiple colorspace components, and multiple nonlinear space conversions in blended NLSPC-3 of FIG. 5 are expensive to implement.

Figure 7:
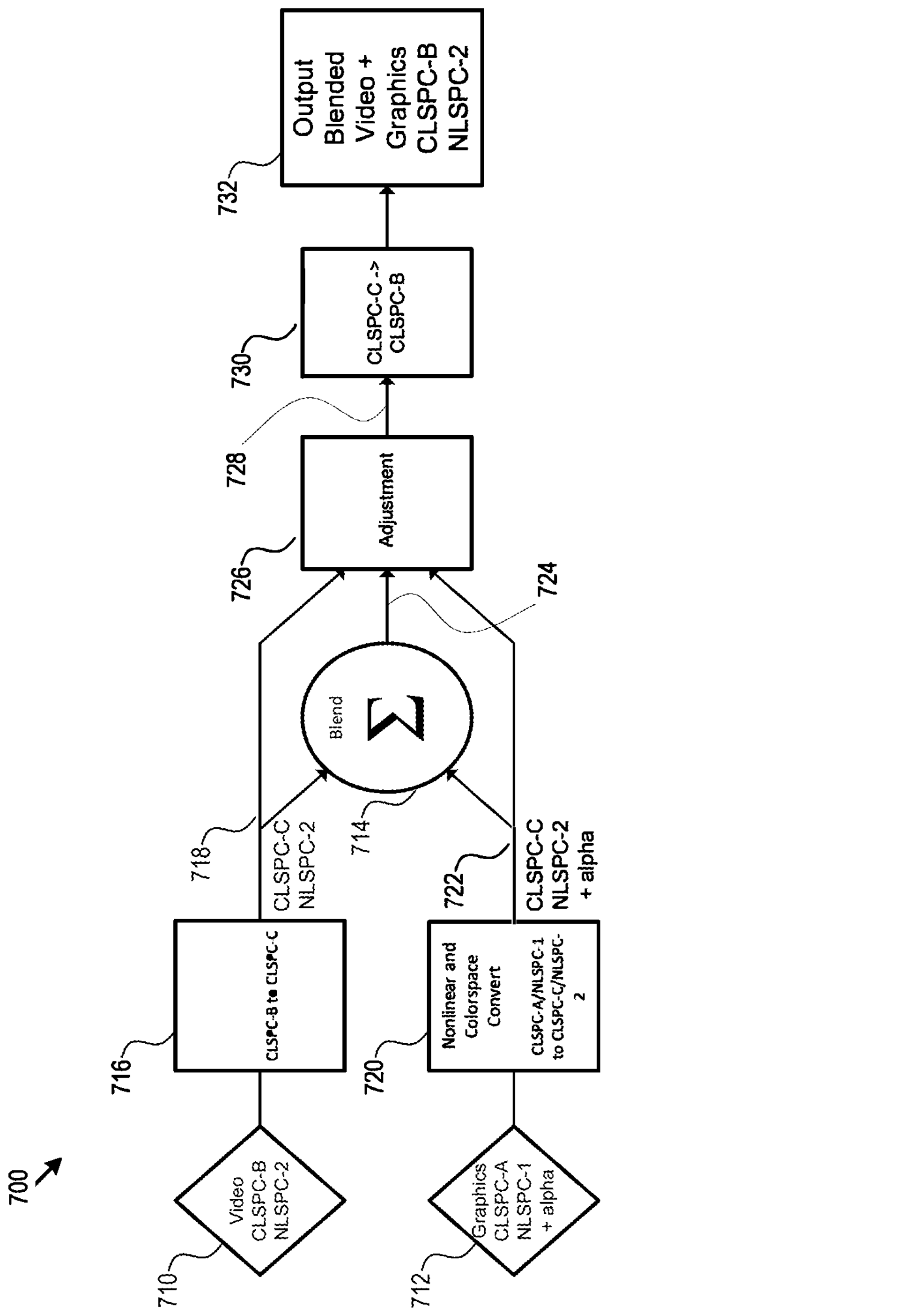
FIG. 7 is a block diagram of a system for video and graphics blending where the video and graphics are both converted into a common colorspace and an adjustment is performed.

Another example of a video and graphics blending system 700 is provided in FIG. 7. Video 710 is received by the system 700. The video 710 may be streamed video and/or stored in a memory by the system 700. The video 710 may be provided in a second colorspace (CLSPC-B). The video 710 may be provided in a second nonlinear space (NLSPC-2). A processor may perform colorspace conversion 716 of the video. The video is converted to a third colorspace space (CLSPC-C) and may remain in the second nonlinear space (NLSPC-2) to generate converted video 718.

Graphics 712 may also be received by the system. The graphics 712 may be generated by a graphics engine and/or stored in a memory by the system. The graphics 712 may be provided in a first colorspace (CLSPC-A). The graphics 712 may be provided in a first nonlinear space (NLSPC-1). The graphics may also include a set of alpha values for defining how the video and graphics will be blended. A processor may perform nonlinear space and color space conversion 720 of the graphics. The graphics are converted to the second nonlinear space (NLSPC-2) and converted to the third colorspace (CLSPC-C) to generate converted graphics 722.

A processor may perform blending processing 714 on the converted video 718 and converted graphics 722 to generate a blended output 724 that is the result of the blended video and graphics. In this example, the blended output 724 may be generated in the third colorspace (CLSPC-C). The blended output 724 may also be generated in the second nonlinear space (NLSPC-2). The third colorspace (CLSPC-C) is selected so that adjustment of an output color component can be performed conveniently based only on the corresponding color component of input video, and the corresponding color component of input graphics and the blending alpha, instead of all three color components of input video, and all three color components of input graphics and the blending alpha. Using the third colorspace (CLSPC-C) reduces the number of input parameters from seven to three. Such convenient third colorspace (CLSPC-C) can be R, G, B, or L, M, S.

A processor may perform an adjustment 726 on the blended output 724. The adjustment 726 may modify the values of the blended output in response to R, G, and B values of the video, R, G, and B values of the graphics, R G, and B values of the blended output, and the alpha of the graphics. In another implementation, the adjustment may modify the values of the blended output in response to L, M, and S values of the video, L, M, and S values of the graphics, L, M, and S values of the blended output and the alpha of the graphics.

The adjustment 726 may be implemented using a 3D lookup table with 3 inputs and an interpolation output for each color component (e.g. R, G, and B or L, M, and S; etc.). The adjusted output 728 may be generated from the blended output 724 according to the adjustment 726. In one example, each red value for each pixel of the blended output may be adjusted in response to the red value of a corresponding pixel in the input video, the red value of a corresponding pixel in the graphics, the red value of that pixel in blended output, and the alpha value or any combination thereof. As such, the adjustment may apply a lookup table to each color component, for example, applying a lookup table three times once for each color component (e.g. R, G, and B or L M, and S; etc.). In some implementations, the same lookup table may be applied once to each color component, thereby reducing the overhead for storing the lookup table.

A processor may perform colorspace conversion 730 of the adjusted output 728. The adjusted output 728 is converted from the third colorspace (CLSPC-C) to the second colorspace (CLSPC-B) and may remain in to the second nonlinear space (NLSPC-2) to generate an output video 732.

FIG. 7 shows an additional elements of the disclosed system that allows for a cheaper implementation. Here, the blending of the video and graphics occurs in a convenient domain that minimizes the number of dependent LUT input color component per output blended color component in NLSPC-2, the number of colorspace and nonlinear-space conversions (often the domain of the video). The output of this blend is then "adjusted" to match the desired visually natural blend in FIG. 7. Since the blend in the convenient domain produces a result that is not too far away from the desired blend for many combinations of video, graphics and alpha input, the magnitude of the adjustment necessary is often small and the adjustment tends to be quite sparse. This makes it cheaper to implement. Along with the reduced number of colorspace and nonlinear-space converters necessary to achieve the desired visually natural video and graphics blend, the adjustment features of FIG. 7 provides for a cheaper system.

Figure 8:
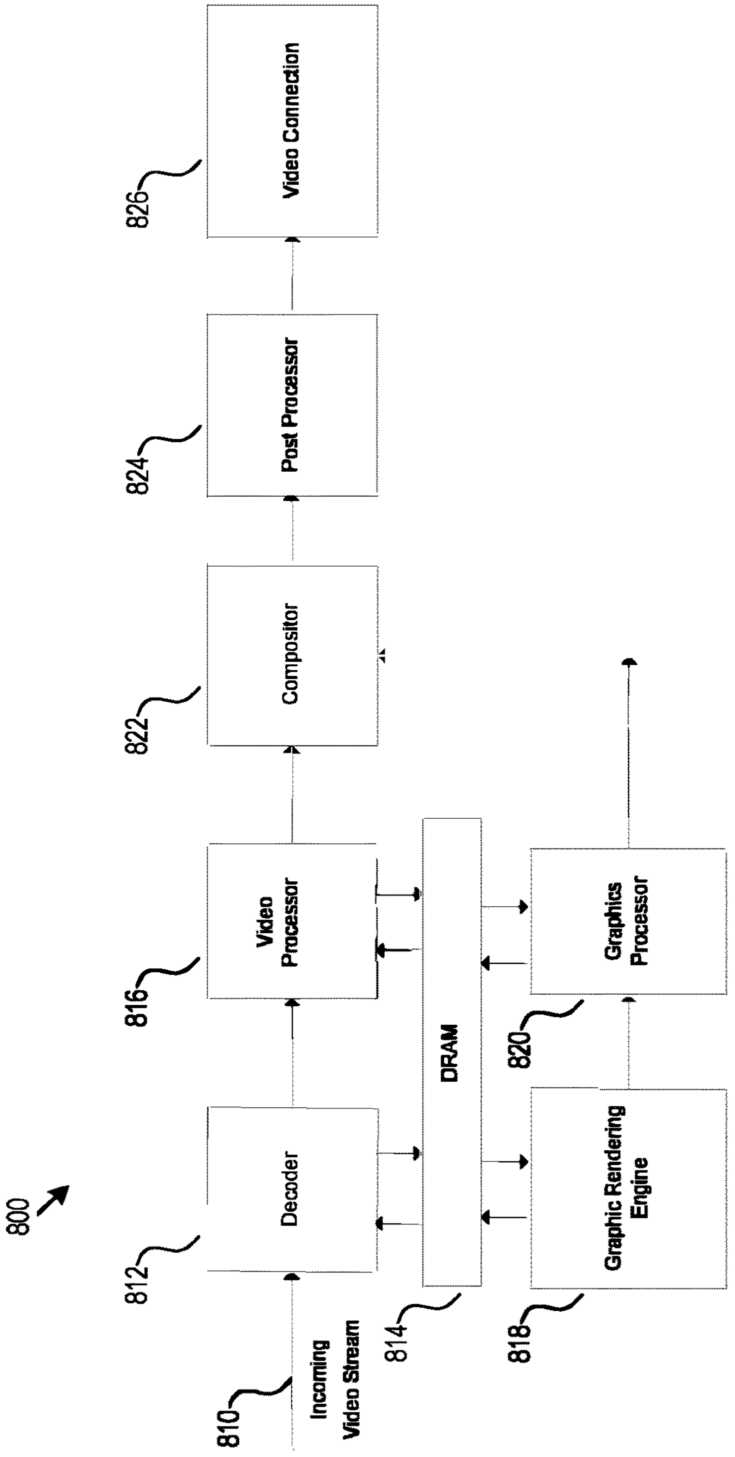
FIG. 8 is a block diagram of the hardware components of a system for video and graphics blending that may be applied to the systems of FIGS. 1-7.

Referring now to FIG. 8, a block diagram of one implementation of a system for blending video and graphics is shown in accordance with the disclosure. The blending system 800 may generally comprise a decoder 812, a memory unit 814, a graphics rendering engine 818 and a compositor 822. The general operation of the system may comprise the decoder 812 decompressing and decoding an incoming video stream 810 and buffering a plurality of video frames of the video stream in the memory unit 814. Once each frame of the video stream has been buffered into the memory unit 814, a video processor 816 may perform various colorspace and or nonlinear space conversions on the video frames of the video stream. A compositor 822 may receive the video frames of the video stream to add additional rendered graphics and enhancement information to each video frame.

The system may generate rendered graphics in a graphics rendering engine 818 in response to a request to display rendered graphics. Examples of requests to display rendered graphics may comprise activating a menu, changing a channel, browsing a channel guide, displaying a photo or video, and other requests that may result in the display of rendered graphics. In response to a request to render graphics, the system may first determine the colorspace and nonlinear space that the will be used to render the graphics. The decision to render the graphics in a particular colorspace or nonlinear space may depend on plurality of performance parameters that may correspond to the capacity of the various components of the system 800 other parameters of components external to the system.

Upon completion of rendering the graphics, the graphics processor 820 may perform colorspace conversions or nonlinear conversions to the rendered graphics. The converted graphics may then be combined with the video frames and combined in the compositor 822 to generate a blended video output. The blended video output may be provided to a post processor 824. The post processor 824 may perform colorspace conversions or nonlinear conversions to the blended video to generate a converted output.

The converted output including combined video frames and graphics may be output to a display by any video connection 826 relevant to the particular application of the graphics scaling system or display device. The video connection may comprise an HDMI graphics connection, component video, A/V, composite, co-axial, or any other connection compatible with a particular video display. The memory unit 810 may comprise any memory capable of storing digital information, for example random access memory (RAM) or dynamic random access memory (DRAM). The processors, decoders, engines and compositors described this application may comprise individual discrete components or hardware processors on a single chip. It is also understood that a single processor may implement the described processes in software in a serial or threaded manner. The hardware block diagram provided in FIG. 8 may be applied to the systems described with regard to FIGS. 1-7. Additionally, each block in FIGS. 1-7 may be implemented as a discreet component, separate circuit on a chip, or portions of logic in a shared processor.

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:

converting first content comprising graphics from a first domain to a blending domain, the first domain being different than the blending domain;

converting second content comprising video from a second domain to the blending domain;

blending the converted first content and the converted second content in the blending domain to generate a blended output in the blending domain, wherein the second domain and the blending domain are each different; and converting the blended output from the blending domain to the first or second domain to generate a converted output, wherein at least one of the converting the first content, the converting the second content, the blending, or the converting the blended output is performed by applying a pre-configured lookup table with an interpolation output for at least one color component, wherein the pre-configured lookup table is pre-configured to take the first content, the second content, and alpha as inputs to produce the interpolation output.

2. The method of claim 1, wherein the pre-configured lookup table is separately applied for each color component.

3. The method of claim 1, wherein the blending domain has a video max brightness that is within HDR specification.

4. The method of claim 1, wherein the pre-configured lookup table is pre-configured to produce the interpolated output of a pre-configured visually natural blending for each combination of the inputs.

5. The method of claim 4, wherein the lookup table is a seven axis lookup table.

6. The method of claim 1, wherein an adjustment is performed after blending based on the converted first content, the converted second content, alpha, and the blended output, wherein alpha indicates a proportion of the first content that is visible in the blended output relative to the second content.

7. The method of claim 6, wherein the adjustment is performed by applying the pre-configured lookup table to each pixel for the at least one color component based on first content values for the at least one color component, second content values for the at least one color component, and blended output values for the at least one color component.

8. The method of claim 7, wherein the pre-configured lookup table comprises decimated pre-calculated values for performing the at least one of the converting the first content, the converting the second content, the blending, or the converting the blended output.

9. A device comprising:

a memory; and at least one processor configured to:

generate first content comprising graphics in a first domain;

receive second content comprising video in a second domain that is different from the first domain;

convert the first content to a third domain forming converted first content, the third domain being different from the first and second domains;

convert the second content to the third domain forming converted second content;

blend, in the third domain the converted first content and the converted second content to generate a blended output in the third domain;

adjust the blended output based on the converted first content, the converted second content, alpha, and the blended output to generate an adjusted output; and convert the adjusted output from the third domain to the first or second domain to generate a converted output, wherein at least one of the converting the first content, the converting the second content, the blending, the adjusting the blended output, or the converting the blended output is performed by applying a preconfigured lookup table with an interpolation output for at least one color component, wherein the pre-configured lookup table is pre-configured to take the first content, the second content, and alpha as inputs to produce the interpolation output.

10. The device of claim 9, wherein the adjusted output is converted to the second domain.

11. The device of claim 10, wherein the converted output is provided in the first or second domain.

12. The device of claim 9, wherein the at least one processor is further configured to adjust the blended output based on the converted first content, the converted second content, and the blended output by applying the pre-configured lookup table to each pixel for each color based on converted first content values for the color, converted second content values for the color, and blended output values for the color.

13. The device of claim 12, wherein the lookup table is a seven axis lookup table.

14. The device of claim 12, wherein a same lookup table is separately applied for each color component.

15. A system comprising:

a first converter circuit configured to receive first content comprising graphics in a first domain;

a second converter circuit configured to receive second content comprising video in a second domain that is different from the first domain, the second converter circuit being configured to convert the second content to a third domain, the first converter circuit being configured to convert the first content to the second domain and the third domain;

a processor configured to blend the converted first content and the converted second content in the third domain to generate a blended output; and a blended output converter circuit configured to convert the blended output from the third domain to the first or second domain to generate a converted output, wherein at least one of the first converter circuit, the second converter circuit, the processor, or the blended output converter circuit is configured to apply a pre-configured lookup table, wherein the pre-configured lookup table takes the converted first content, the converted second content, and alpha as inputs and produces an output of the blended output.

16. The system according to claim 15, wherein the third domain matches a max brightness of the second domain.

17. The system of claim 15, further comprising at least one memory configured to store the pre-configured lookup table, and the processor is further configured to use the pre-configured lookup table to produce the blended output using an interpolation output for at least one color component.

18. The system of claim 17, wherein the pre-configured lookup table is a seven axis lookup table.

* * * * *